Patented Sept. 9, 1947

2,427,077

UNITED STATES PATENT OFFICE 2,427,077

CHLORINATED POLYISOBUTYLENE-PETROLEUM COKE MOULDING COMPOUND

Allan L. Tarr, Boulder City, Nev., and George W. Oxley, Elizabeth, N. J., assignors to Standard Oil Development Company, a corporation of Delaware No Drawing. Application January 22, 1944, Serial No. 519,406

4 Claims. (Cl. 260—4)

This application relates to plastic compositions, relates particularly to thermoplastic moulding compounds; and relates especially to moulding compounds composed of chlorinated polyisobutylene and pulverized petroleum coke.

A wide range of thermoplastic moulding compositions has been prepared, all of which lack one or another of the important physical properties, and none of which is satisfactorily fire resistant and of good strength.

The present invention provides a new, thermoplastic moulding composition of excellent physical strength, high resistance to chemical reagents, and high resistance to combustion. This material is prepared from chlorinated polyisobutylene and pulverized petroleum coke; materials neither of which shows any substantial physical strength, either in tension or in compression, but which together, perhaps by virtue of an unexpected chemical reaction between the chlorinated polymer and the pulverized coke show an excellent physical strength both in tension and compression.

Thus the composition of matter of the present invention consists of a chlorinated high molecular weight polyisobutylene in combination with a pulverized petroleum coke. Other objects and details of the invention will be apparent from the following description:

The raw materials for the composition of the present invention consist in part of chlorinated polyisobutylene. It has been found possible, as is well known to those skilled in the art, to polymerize isobutylene by cooling it to temperatures ranging from 0° C. down to —100° C. or lower, down to temperatures as low as —165° C., and then polymerizing the isobutylene by the application to the cold mixture of a Friedel-Crafts type catalyst such as boron trifluoride or aluminum chloride in solution in a suitable low-freezing, non-complex-forming solvent to yield a polymer having a molecular weight, as determined by the Staudinger method, within the range from 5000 to 100,000 or even as high as 500,000, depending upon the potency of the catalyst used, the lowness of the temperature of polymerization and the purity of the isobutylene. When the polymerization has reached the desired stage, the polymer is brought up to room temperature, and, if desired, is washed or otherwise processed for the removal of impurities such as the catalyst and any residual traces of unpolymerized material or catalyst solvent, or the like.

The polymer is reactive with elemental chlorine, preferably applied to the polymer in solution in a suitable solvent such as carbon tetrachloride or other chlorinated hydrocarbon solvent or solvent which is not reactive with chlorine. When in solution, the polymer chlorinates readily merely by bubbling the chlorine through the solution. In the dark, the amount of chlorine absorbed by the polymer depends upon the pressure and temperature, and by chlorinating to equilibrium under fixed conditions of temperature and pressure, any desired, uniform value of chlorine content may be obtained. At room temperature and atmospheric pressure the amount of chlorine which is absorbed in the dark is below 25%, which is undesirably low for the purposes of the present invention. Hence elevated temperatures and pressures are desirable to yield polymer material having chlorine contents ranging from 40% to 75% or 80%. Alternatively, the chlorination can be continued in the presence of natural or artificial ultra violet light to obtain a chlorinated polymer containing the desired percentage of chlorine.

In the preparation of the original polymer, substantially any of the Friedel-Crafts type catalysts disclosed by N. O. Calloway in his article on "The Friedel-Crafts synthesis," printed in the issue of "Chemical Reviews" published for the American Chemical Society at Baltimore, in 1935, in volume XVII, No. 3, the article beginning on page 327, the list being particularly well shown on page 375, may be used, and for solvent any of the mono- or polyalkyl halides which have freezing points below the freezing point of water may be used, all of the alkyl halides being non-complex-forming. In addition, carbon disulfide is a highly advantageous catalyst solvent.

In the preparation of the chlorinated polymer for the present invention, it is desirable that the polymer have a molecular weight above 10,000 and very little is gained by preparing a polymer with a molecular weight above about 50,000, although polymers of any molecular weight above about 5,000 are satisfactory and usable. In the chlorination of the polymer, it is advantageous to chlorinate to a chlorine content above about 30%, since below 30%, the resulting plastic has an undesirably high softening point, and does not yield an advantageously high strength.

The most desirable chlorine content is found to be between about 50% and 70%, since at such amounts of chlorine the polymer is still somewhat elastic, is conveniently thermoplastic, and is sufficiently hard to yield a composition of matter according to the invention of excellent physical properties.

For the petroleum coke component of the invention, the coke obtainable from either the cracking coils or from the ordinary stills is satisfactorily usable.

However, advantages are obtainable from a coke having therein a residual small amount of high molecular weight hydrocarbons which are not volatile either at the temperature of distillation, or with steam as in steam reduced material. The preferred coke is derived from the cracking of a gas oil, or a topped crude or a very heavy naphtha. In many instances it is convenient and satisfactory to mix together several forms of coke since the better forms will carry a substantial proportion of less desirable forms. It is even possible to use small amounts of gashouse coke, although this serves mainly merely as an inert filler.

The coke which is to be used is preferably ground in any desired type of mill. The preliminary grinding may be accomplished in a crusher or a hammer mill and the final grinding is preferably conducted in a ball mill or rod mill, although any convenient type of mill which will grind the coke to a fineness such that 99% will pass through a 200 mesh sieve is satisfactory. It is not necessary that a particularly uniform particle size be obtained in the preparation of the coke but merely that unduly large particles be kept to a minimum.

It may be noted that the coke used as the primary component with the chlorinated polyisobutylene should be one which has not been subjected to unduly high coking temperatures but should contain small quantities of hydrogen. It is unknown at the present time what the exact chemical nature of such a coke is, although it has been suggested that the coke contains significant portions of very high molecular weight unsaturated hydrocarbons; and that the solid coke itself is in effect a relatively very high molecular weight unsaturated compound from which nearly all of the hydrogen has been removed to leave a material which is nearly all carbon but with double or triple linkages between the carbon atoms. There is some support for a theoretical suggestion that this coke is a very high molecular weight polyolefin in which nearly all of the linkages between the carbon atoms are double linkages or even triple linkages. In any event the coke should be a material which has not been heated unduly, but heated only to such a temperature that there remains in it a significant amount of hydrogen and perhaps small amounts of very high molecular weight unsaturated hydrocarbons. This description is best satisfied by cracking coil coke from gas oil, topped crude or heavy naphtha, but by proper treatment, low temperature coke from coal may be used for at least a part of the material, and the coke from brown coal, if produced at minimum temperatures, is also usable, at least in part, as is also coke from the low temperature carbonization of coal.

Broadly, the composition of the present invention consists of a mixture of from 5% to 30% of chlorinated polyisobutylene with from 95% to 70% of petroleum coke having a particle size such that 99% will pass through a 200 mesh sieve. It is desirable that the chlorinated polyisobutylene contain from 40% to 80% of chlorine, the preferred value being at approximately 60 to 65%; as obtained from a polyisobutylene having a molecular weight above 5,000; with no necessary upper limit since the highest obtainable polymers are useful. Alternatively, the polyisobutylene may contain from 5 to 20% of natural rubber or other rubber-like polymer such as the polybutadiene or the polymer of a butadiene with styrene or the polymer of butadiene with acrylonitrile or the low temperature copolymer of isobutylene and a diolefin before being chlorinated.

It should be noted that too much of the chlorinated polymer is undesirable since it may cause difficulties in the molding by adhesion to the mold. The above indicated proportions of from 5% to 30% of the chlorinated polymer are well within the proportions which are free from molding troubles; by careful handling, amounts from 40 to 45 or 50% of the chlorinated polymer may be used, although these are not as a rule as satisfactory.

*Example 1*

A mixture was prepared consisting of 20 parts by weight of chlorinated polyisobutylene prepared from polymer having a molecular weight of approximately 40,000, containing approximately 63% of chlorine, with 80 parts by weight of petroleum coke pulverized to pass 99% through a 200 mesh sieve. The coke was prepared by washing with a light petroleum hydrocarbon solvent (Solvesso No. 2), followed by a washing with benzol. The material was ground in a mill to pass 100% through a 200 mesh sieve. Simultaneously, the chlorinated polyisobutylene was freed from solvent and the solid chlorinated polymer also ground to pass 100% through a 200 mesh sieve. The two materials were then mixed in the proportion of 80 parts of the ground washed coke and 20 parts of the solvent-free, ground chlorinated polymer, the mixture being very thoroughly stirred until homogeneous. A mould was then prepared and heated to a temperature of approximately 200° F. (a temperature within the range of 160° F. to 320° F. being suitable). The mixed powdered materials were then charged into the mould and the mould closed under a pressure of approximately 4500 pounds per square inch (a pressure within the range of from 3000 pounds up to the highest conveniently obtainable being satisfactory). The mould was kept closed under this pressure until the composition was well heated through; 3 to 10 minutes being sufficient for articles having a maximum section thickness of ½ inch.

The molded article was then removed from the mould after brief cooling, and then brought to room temperature. The density of the material was found to be approximately 1.5 grams per cubic centimeter. The tensile strength was found to be good, and the crushing strength was found to be approximately 13,250 pounds per square inch. The material was thoroughly solid, free from any tendency towards cold flow. The material took a high polish either from polished dies or by friction polishing of the finished article. It is water repellent, slightly oily in surface character and wholly insoluble in water. It is wholly insoluble in all of the organic and mineral acids.

It may be noted that coke ordinarily is regarded as having a low electrical resistance. The molded composition of the present invention showed the astonishingly high electrical resistance of well over 1,000,000 ohms per cubic inch (10 megohms or above per centimeter cube).

The relatively high chlorine content, and the high density of the material, yields a material of relatively good fire resistance properties. At high temperatures the material chars and, being carbonaceous, it will, if the temperature is high enough, burn, but the decomposition temperature is very high and the resistance to spontaneous combustion is also extremely high.

*Example 2*

Another compound was prepared as in Example 1, but the polyisobutylene was mixed with 10% natural rubber and the mixture chlorinated to a chlorine content of approximately 63%. This material likewise showed a good tensile strength and a crushing strength of 3820 pounds per square inch (on a specimen ½ inch high and 1 inch in diameter).

*Example 3*

A similar mixture was prepared containing 10% of natural rubber with 90% of polyisobutylene and chlorinated to a chlorine content of approximately 63%. This material likewise showed a good tensile strength and a crushing strength of 2610 pounds per square inch (on a specimen ½ inch high and 1 inch in diameter).

The above examples used merely the essential mixture of chlorinated polyisobutylene and petroleum coke. However, many auxiliary fillers may be added, including such substances as asbestine, asbestos fiber, fuller's earth and other clays, diatomaceous earth, slate flour, barytes, china clay, kaolin, chalk and the like. Alternatively, most of the ordinary pigments and fillers used with molded compositions generally are useful with the present composition of matter. The range of fillers usually is from 1 or 2% to a maximum of 50%, and in the higher ranges, larger quantities of the chlorinated polymer are usually desirable. The fibrous fillers particularly are effective for increasing both the tensile strength and the crushing strength.

The exact nature of the reaction occurring between the chlorinated polyisobutylene and the petroleum coke is not at the present time known. It is well established that petroleum coke is not pure carbon, and not crystalline. It is also well established that the amount of carbon present in petroleum coke is above 95 to 98% and in many instances above 99%, and that the petroleum coke contains small traces of hydrogen. The present situation indicates the possibility that petroleum coke is in part, at least, a high molecular weight carbon chain compound containing a substantial number of carbon atoms per molecular chain, with a relatively very small amount of combined hydrogen and a large number of highly unsaturated carbon to carbon linkages. The interaction between the two members further suggests the possibility of some sort of additional copolymerization between the chlorinated polymer and the coke-like material. It is entirely possible that under the conditions of temperature and pressure used for moulding and curing the material, an interaction occurs between the olefinic linkages in the coke and the chlorine of the chlorinated polymer, to yield an interpolymer between the olefinic linkages in the coke and the point of prior attachment of the chlorine. Alernatively, it may merely be that the conditions of adsorption and adhesion between the polymer and the coke are unusually and unexpectedly powerful. In any event, the good crushing and tensile strengths of the compound, in comparison with the low crushing strength of the coke itself, and the substantial absence of crushing strength from the chlorinated polymer is a most unexpected, and highly valuable, interaction. That is, in the present instance, the crushing strength of 2610 to 13,250 pounds per square inch is far more than would be expected from a mixture of coke having very low crushing strength, and a chlorinated polymer having a low crushing strength. It may be noted that finely ground coke does not coalesce or bond together by itself under pressures as high as 4 to 6 or 7000 pounds nor at temperatures as high as 550° C.

Thus the invention provides a new and useful composition of matter which is particularly suitable for the preparation of mouldable compositions generally which shows excellent physical strength, good electrical properties and high resistance to weathering.

While there are above disclosed but a limited number of embodiments of the composition of the present invention, it is possible to produce still other embodiments without departing from the inventive concept herein disclosed and it is therefore desired that only such limitations be imposed on the appended claims as are stated therein or required by the prior art.

The invention claimed is:

1. A composition of matter comprising a mixture of 5% to 30% of finely divided dry solid polyisobutylene polymer chlorinated to contain from 40% to 80% of chlorine and having a molecular weight before chlorination above 5000, with 95% to 70% of pulverized petroleum coke containing a small amount of hydrogen and of such fineness that 99% will pass through a 200 mesh sieve.

2. A composition of matter comprising a mixture of 5% to 30% of a chlorinated polyisobutylene polymer-rubber mixture containing from 40% to 80% of chlorine, said polyisobutylene before chlorination having a molecular weight above 5000 and said rubber forming about 5% to 10% of the polyisobutylene-rubber mixture, with 95% to 70% of pulverized petroleum coke of such fineness that 99% will pass through a 200 mesh sieve, said coke containing a small amount of hydrogen.

3. A method of molding which comprises compressing at a temperature from 160° F. to 320° F. and under a pressure above 3000 lbs./sq. in. a mixture of 5% to 30% of chlorinated polyisobutylene containing from 40% to 80% of chlorine, said polyisobutylene before chlorination having a molecular weight above 5000, and 95% to 70% of pulverized petroleum coke of such fineness that 99% will pass through a 200 mesh sieve, said coke containing a small amount of hydrogen, to produce a molded article having a crushing strength within the range of between 2610 and 13,250 lbs./sq. in.

4. A method according to claim 3 wherein said polyisobutylene contains in admixture 5% to 10% of rubber.

ALLAN L. TARR.
GEORGE W. OXLEY.

REFERENCES CITED

The following references are of record in the file of this patent:

UNITED STATES PATENTS

| Number | Name | Date |
|---|---|---|
| 27,251 | Willmann | Feb. 21, 1860 |
| 2,138,895 | Wiezevich | Dec. 6, 1938 |
| 2,262,092 | Buffington | Nov. 11, 1941 |
| 2,291,403 | Morway et al. | July 28, 1942 |
| 2,334,277 | Morrell et al. | Nov. 16, 1943 |
| 2,213,331 | Arveson | Sept. 3, 1940 |
| 1,856,680 | Williams | May 3, 1932 |
| 2,224,724 | Elsey | Dec. 10, 1940 |